(12) United States Patent
Johnson

(10) Patent No.: US 6,879,052 B1
(45) Date of Patent: Apr. 12, 2005

(54) POWER SYSTEM FOR A TELECOMMUNICATION FACILITY

(75) Inventor: Larry L. Johnson, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 10/886,345

(22) Filed: Jul. 7, 2004

Related U.S. Application Data

(62) Division of application No. 10/298,074, filed on Nov. 15, 2002.

(51) Int. Cl.$^7$ .................................................. H02P 9/04
(52) U.S. Cl. ........................... 290/1 A; 290/1 R; 307/64
(58) Field of Search ................................ 290/1 R, 1 A, 290/52; 307/64; 322/7

(56) References Cited

U.S. PATENT DOCUMENTS

| | | | |
|---|---|---|---|
| 4,283,634 A | 8/1981 | Yannone et al. | |
| 6,011,324 A | 1/2000 | Kohlstruck et al. | |
| 6,184,593 B1 | 2/2001 | Jungreis | |
| 6,380,637 B1 | 4/2002 | Hsu et al. | |
| 6,452,289 B1 | 9/2002 | Lansberry et al. | |
| 6,463,738 B1 * | 10/2002 | Pinkerton et al. | ............. 60/646 |
| 6,498,462 B2 | 12/2002 | Ballantine et al. | |
| 6,516,616 B2 * | 2/2003 | Carver et al. | ................. 60/659 |
| 6,522,955 B1 | 2/2003 | Colborn | |
| 6,649,289 B2 | 11/2003 | Hsu et al. | |
| 6,670,721 B2 | 12/2003 | Lof et al. | |
| 6,700,214 B2 * | 3/2004 | Ulinski et al. | ............. 290/40 C |
| 6,703,722 B2 | 3/2004 | Christensen | |
| 2001/0009338 A1 | 7/2001 | Reutere | |

FOREIGN PATENT DOCUMENTS

WO    WO 99/32762    7/1999

OTHER PUBLICATIONS

Yutaka, Kuwata, "Multifueld Fuel–Cell Energy System for Telecommunications Cogeneration System," Iece Trans. Commun., vol. E1 B., No. 11, Nov., 1998.

* cited by examiner

*Primary Examiner*—Nicholas Ponomarenko

(57) ABSTRACT

A power system specifically designed to provide reliable electrical power to a telecommunication facility is disclosed. The system includes a number of microturbine generators adapted to provide AC power that is then rectified to DC power by an array of rectifiers. The system is configured so that the microturbine generators are fueled initially by utility-supplied natural gas. In the event the utility-supplied natural gas fails, the system provides propane from a storage tank to fuel the microturbine generators. If both microturbine generator fuel sources fail or their fuel supply becomes exhausted, power is supplied to the rectifiers by a commercial electrical utility. The system also includes a number of hydrogen-powered proton exchange membranes that are operable to supply DC power directly to the facility if both the microturbine generators and the electrical utility fail. Finally, a number of super capacitors are coupled to the bus line directly connected to the facility in order to maintain power if it becomes necessary to switch power sources.

20 Claims, 2 Drawing Sheets

POWER SYSTEM FOR A TELECOMMUNICATION FACILITY

CROSS-REFERENCE TO RELATED APPLICATIONS

This application is a division of U.S. patent application Ser. No. 10/298,074 filed Nov. 15, 2002.

STATEMENT REGARDING FEDERALLY SPONSORED RESEARCH OR DEVELOPMENT

Not applicable.

BACKGROUND OF THE INVENTION

In general, this invention relates to a system for providing electrical power. More specifically, this invention is directed to a system particularly adapted to provide reliable electrical power for the operation of a remote telecommunications facility.

Although it may be utilized in numerous applications, this invention is specifically adapted to provide power for the continuous operation of a remote telecommunications facility. With its core technology substantially composed of digital components, the telecommunications industry is heavily dependent on the continued supply of reliable electrical power. The critical nature of the functions performed by remote telecommunications facilities further emphasizes the need for a dependable power supply.

Most telecommunications facilities rely on a commercial power utility for electrical power and employ traditional devices, such as a transformer and switchgear, to safely receive and use the electrical power. To insure the facility's power supply is not interrupted, such as in the case of a black-out or other disturbance in the commercial power system, many telecommunications facilities have a system for providing backup power. Although various designs are used, many backup systems employ a diesel generator and an array of batteries. If power from the commercial utility is lost, the diesel generator takes over to supply power, and the battery array insures that power is maintained during the time it takes to switch from utility-supplied power to generator-supplied power. If the generator also fails, such as due to a mechanical malfunction or to the depletion of its fuel source, then the battery array is able to provide power for an additional period of time.

There are several disadvantages inherent in the current manner in which power is supplied to telecommunications facilities. First, the cost of local electrical utility service has risen dramatically in recent years and, by all accounts, will continue to rise. Thus, the cost of local electrical utility power is a large component of the facility's overall power expenses. Next, as the facility's power demands have increased, the number of batteries required to provide an adequate amount of power for a reasonable period of time has also increased. Clearly, the component cost of the system increases with the greater number of batteries required. In addition, the greater number of batteries required has significantly increased the space required to house the backup system, which has increased the spacial cost of the systems. Finally, it is known that generators suffer from certain reliability problems, such as failing to start when needed because of disuse or failed maintenance. Therefore, the reliability of the backup systems could be improved.

The power system of the present invention overcomes these disadvantages by providing reliable electrical power that is not initially dependent on a commercial electrical utility and that does not employ an array of batteries. The system, therefore, is more cost efficient and requires less space than the present manner of providing power to facilities. The invention employs redundant sources of power, and thus, is uninterruptible. Also, the system employs power generating components that have less of an impact on the environment than the current manner in which power is supplied. Moreover, the system may be constructed at a manufacturing site and then moved to the facility. Thus, the system of the present invention provides power to a telecommunications facility in a manner that is less expensive, that requires less space, that is movable, and that is environmentally friendly.

BRIEF SUMMARY OF THE INVENTION

The present invention includes a power system that is designed to provide reliable electrical power to a facility, and specifically to a telecommunications facility. The system includes a number of microturbine generators adapted to provide AC power. The system is configured so that the microturbine generators are fueled initially by natural gas supplied by a commercial utility. In the event the natural gas supply fails, the system includes a propane storage tank to provide fuel to the microturbine generators. The system also has an array of rectifiers to convert the AC power from the microturbine generator to DC power. If both of the microturbine generators' fuel sources fail or become exhausted, power is supplied to the rectifiers by a commercial electrical utility, and the system includes components to receive the utility-supplied electricity. The system also includes a number of hydrogen-powered proton exchange membranes that are operable to supply DC power directly to the facility if both the microturbine generators and the electrical utility fail. Finally, the system includes a number of super capacitors that are operable to maintain power during the time required to change between power sources.

BRIEF DESCRIPTION OF THE SEVERAL VIEWS OF THE DRAWING

The present invention is described in detail below with reference to the attached figure, wherein.

DETAILED DESCRIPTION OF THE INVENTION

The present invention includes both a system and a method for providing reliable electrical power to a facility, and specifically to a telecommunications facility. The system provides redundant sources of electrical power including a number of microturbine generators and a number of proton exchange membranes (PEMs). The system also includes a number of capacitors to provide power during the time it takes to switch between power sources. By employing these components, the system avoids the need for an array of batteries and is more cost efficient than the current method for providing power to telecommunications facilities.

Figure 1:
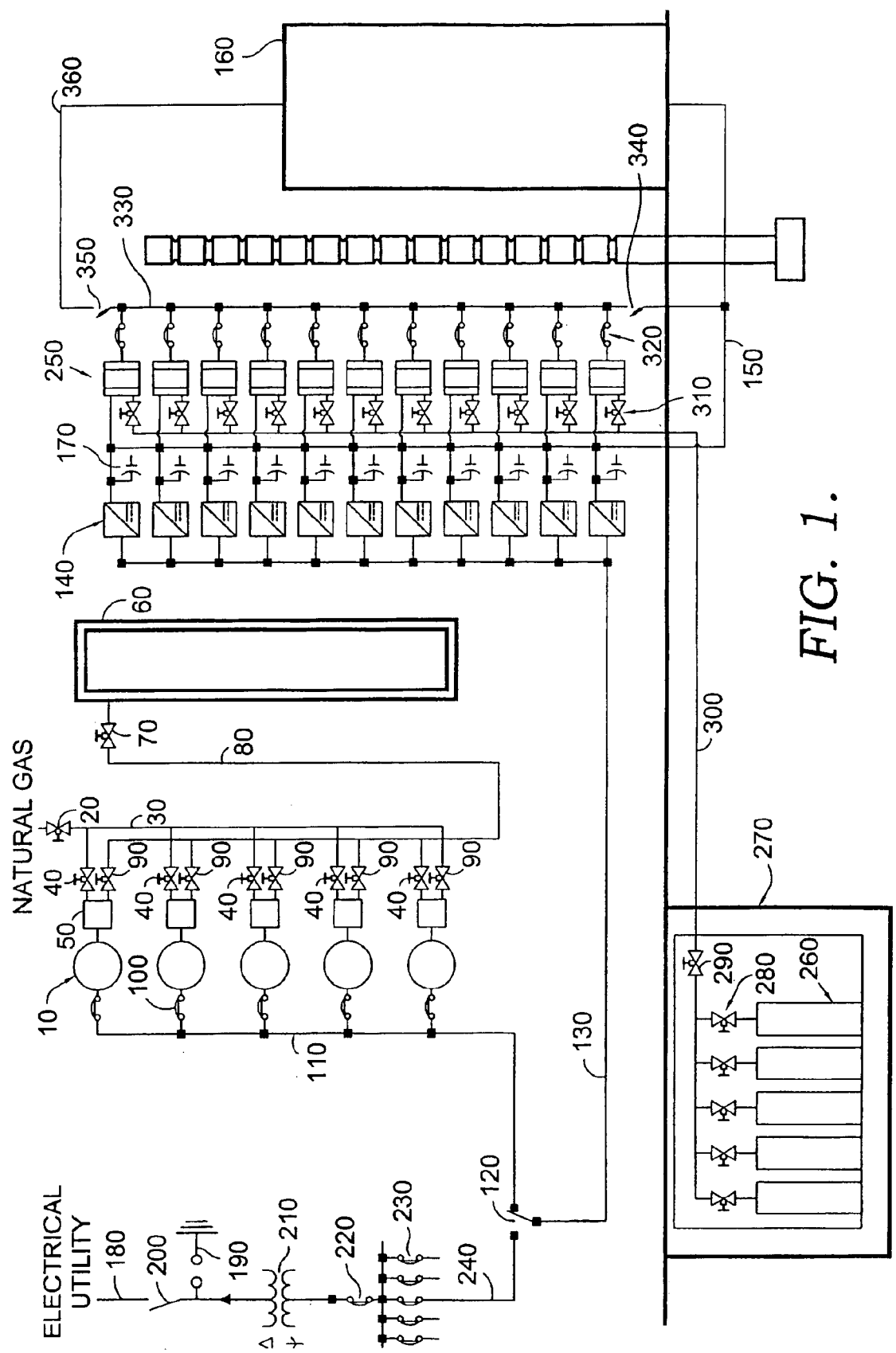
FIG. 1 is a schematic diagram of the present invention without the sensing/control mechanism.
Figure 2:
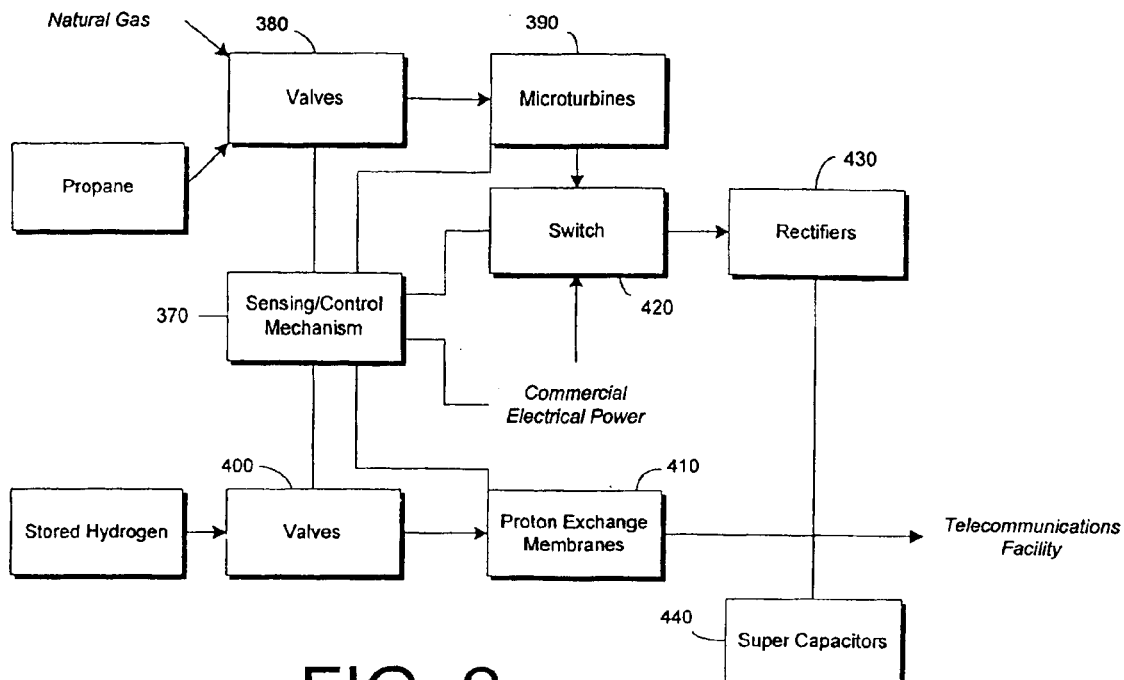
FIG. 2 is a functional block diagram of the major components of the present invention.
Figure 3:
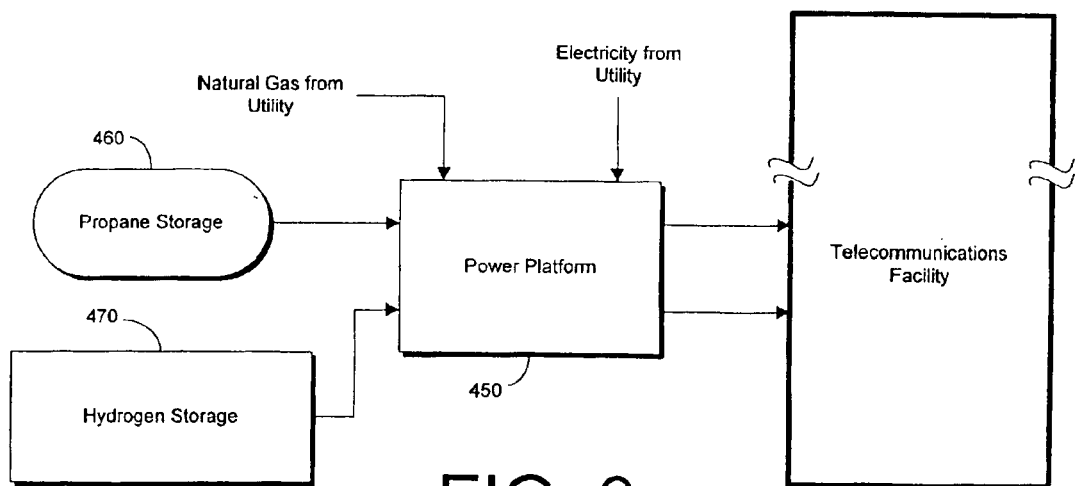
FIG. 3 is a block diagram showing the physical relationship of the present invention.

The present invention is best understood in connection with the schematic diagram of FIGS. 1–3. In FIG. 1, the power system of the present invention initially comprises a number of microturbine generators 10. A turbine includes a rotary engine actuated by the reaction or impulse or both of a current of fluid, such as air or steam, subject to pressure and an electrical generator that utilizes the rotation of the engine to produce electrical power. Microturbine generators are a recently developed technology and have not been employed to provide power to a telecommunications facility. A microturbine is smaller and more compact than more common turbines and creates a lower amount of harmful emissions than both more common turbines and diesel generators. A microturbine generator includes a system for receiving fuel, a microturbine for converting the fuel received to electrical power and a digital power controller. Thus, a microturbine generator is able to utilize a fuel source such as natural gas or propane to produce electrical power. One microturbine generator that is suitable for the present invention is the Capstone 60 MicroTurbine™ system produced by the Capstone Turbine Corporation of Chatsworth, Calif. As is understood by those in the art, the number of microturbine generators used in the inventive system depends on the amount of power required by the destination facility.

The present invention is designed to provide fuel from two different sources to microturbine generators 10. Initially, microturbine generators 10 are fueled by natural gas. The natural gas is received in primary fuel valve 20 which is coupled to primary fuel pipe or line 30. Pipe 30 is also coupled to a series of valves 40, and each of valves 40 is also coupled to an input of a corresponding mixing box 50. The output of mixing boxes 50 is coupled to the input of one of microturbine generators 10. Microturbine generators 10 may also be powered by propane stored in a local storage tank 60. The propane is received through backup fuel valve 70 which is coupled to backup fuel pipe or line 80. Pipe 80 is also coupled to a series of valves 90, and each of valves 90 is coupled to an input of mixing boxes 50. Mixing boxes 50 is operable to combine fuel received with any necessary additional components and thereafter provide appropriate amounts of fuel to microturbine generators 10. Mixing boxes 50 are capable of receiving and responding to a control signal by at least opening or closing lines. In addition, valves 20, 40, 70 and 90 are also capable of receiving and responding to a control signal by at least opening and closing.

Microturbine generators 10 utilize the natural gas or propane fuel to produce AC electrical power. The output electrical current from each microturbine generator 10 is coupled to one end of a circuit breaker 100 in order to protect the circuit such as, for example, if microturbine generator 10 causes a power surge. The opposite end of circuit breakers 100 is coupled to a bus line 110 that is also coupled to switch 120. Bus line 130 is coupled to the output of switch 120 and to a number of rectifiers 140. As is known, a rectifier is capable of receiving an AC input and rectifying or converting that input to produce a DC output. Thus, rectifiers 140 convert the microturbine-produced AC power to DC power. The output of rectifiers 140 is coupled to bus line 150 which is connected to the power distribution unit 160 in the destination facility. Power distribution unit 160 contains connections into the telecommunications facility's power lines, and/or provides connections to the various telecommunications equipment. Power distribution unit 160 may also contain additional circuit breakers or other power switch gear or safety devices and/or circuits, including circuits to limit the voltage or current provided to the facility's power lines, and monitoring/measuring equipment. A number of super capacitors 170 are also connected to bus line 150.

The system of the present invention is also capable of receiving power from a commercial utility. Utility-supplied power is received on bus line 180, and a connection to ground is provided through line 190. Bus line 180 is connected to one side of switch 200, and the other side of switch 200 is coupled to the primary side of transformer 210. As is known, a transformer is capable of receiving an input signal on its primary side and producing a corresponding signal on its secondary side that is electronically isolated from the input signal. The secondary side of transformer 210 is coupled to one side of a main circuit breaker 220. The opposite side of main circuit breaker 220 is coupled to one side of a number of circuit breakers 230. The opposite side of one of the circuit breakers 230 is connected to bus line 240; the remaining circuit breakers 230 are available to provide electrical power for additional applications or systems. Bus line 240 is also connected to an input of switch 120.

The power system of the present invention also includes a number of proton exchange membrane fuel cell modules (PEMs) 250. A PEM is a device that is capable of converting dry gaseous hydrogen fuel and oxygen in a non-combustive electrochemical reaction to generate DC electrical power. Because the only by-products of this reaction are heat and water, a PEM is friendly to the environment and may be used indoors and in other locations where it is not possible to use a conventional internal combustion engine. In addition, unlike a battery, a PEM is capable of providing electrical power for as long as fuel is supplied to the unit. One PEM that is suitable for the present invention is the Nexa™ power module manufactured by Ballard Power Systems Inc. of Burnaby, British Columbia, Canada. As with microturbine generators 10, the number of PEMs 250 required is dependent on the amount of power required by the destination facility.

Hydrogen fuel is supplied to the PEMs 250 from a number of storage tanks 260 located in a vault 270. Each of the storage tanks 260 is coupled to a valve 280. Each of valves 280 is coupled to a valve 290 which is also coupled to a pipe 300. Thereafter, pipe 300 is coupled to a series of valves 310, and each of valves 310 is coupled to one of the PEMs 250. The output of the PEMs 250 is connected between bus line 150 and a circuit breaker 320. As stated above, super capacitors 170 and the power distribution unit 160 of the facility are also connected to bus line 150. The other side of circuit breakers 320 is connected to a bus line 330. There are two switches connected to bus line 330. Switch 340 is coupled to bus line 330 on one side and bus line 150 on the other side. Switch 350 is coupled to bus line 330 on one side and bus line 360 on the other side. Unlike bus line 150, bus line 360 is only connected to power distribution unit 160 of the facility.

The power system of the present invention also comprises a number of sensing and control mechanisms (not expressly shown) for determining which fuel source to activate and which power source to engage. As is known, the sensing mechanisms may be separate devices or may be integral to the valves, bus lines, and/or devices being monitored. Likewise, the control mechanism may be a separate device, such as a programmable logic controller, or may be part of one of the components already described, such as the microturbine generators 10. It is also possible that the sensing and control mechanisms may be combined into a solitary mechanism that may be a stand-alone unit or may be combined with one of the components already described.

The operation of the power system may be understood by referring to FIG. 2. It should be noted that the present invention is represented in FIG. 2 by functional blocks. Thus, sensing/control mechanism 370 is shown as one unit when in fact the sensing and control devices actually may be several devices as discussed previously. Of course, all of the sensing and control devices actually may be placed together in a separate unit, such as a programmable logic controller, as shown in FIG. 2.

In operation, the sensing/control mechanism 370 initially causes valves 380 (which include valves 40 and 90 shown in FIG. 1) to allow natural gas to flow from the utility source to the microturbine generators 390 and to prevent the flow of propane to microturbine generators 390. Sensing/control mechanism 370 also initiates operation of the microturbine generators 390. In addition, sensing/control mechanism 370 also causes valves 400 (which include valves 310 shown in FIG. 1) to prevent the flow of hydrogen to the PEMs 410 and causes the PEMs 410 to remain off. In this manner, microturbine generators 390 produce AC power using utility-supplied natural gas. The AC current produced by the microturbine generators passes through switch 420 to rectifiers 430 where it is converted to DC current. Thereafter, the DC current from rectifiers 430 is provided to the telecommunications facility and to super capacitors 440. As is well known, when they first receive DC current, super capacitors 440 charge to the level of the DC power provided.

If sensing/control mechanism 370 determines that there is an interruption in the utility-supplied natural gas, then it will cause valves 380 to prevent the flow of natural gas and allow the flow of hydrogen to microturbine generators 390. Switch 420 remains in the same position as before and valves 400 continue to prevent the flow of hydrogen to PEMs 410. In this configuration, microturbine generators 390 continue to generate AC power but now their fuel is propane.

If the sensing/control mechanism 370 determines that both fuel sources for microturbine generators 390 have failed or that there is some other disturbance in the microturbine-supplied power which causes that power to become inadequate, then sensing/control mechanism 370 will cause valves 380 to close and deactivate the microturbine generators 390. Sensing/control mechanism 370 will set switch 420 so that rectifiers 430 receive AC power from the electric utility. In addition, sensing/control mechanism 370 will keep valves 400 closed and PEMs 410 deactivated.

If sensing/control mechanism 370 determines that the electric utility has failed or the power it supplies has become inadequate and the microturbine generators 390 remain deactivated, such as due to a lack of fuel or a malfunction, then sensing/control mechanism 370 will cause valves 400 to open which allows hydrogen to flow to PEMs 410. Thereafter, the control mechanism will activate PEMs 410. In this manner the PEMs 410 provides DC power to the telecommunications facility and to super capacitors 440.

In each of the above scenarios, super capacitors 440 provide electrical power during the time it takes for the control mechanism to switch from one power source to another. Thus, super capacitor 440 must have a discharge time greater than the longest time required to switch between power sources. One super capacitor that is suitable for this invention is manufactured by Maxwell Technologies located in San Diego, Calif.

Referring now to FIG. 3, significant portions of the present invention may be enclosed in a modular, weatherproof container, indicated by the numeral 450, that is transportable by truck or rail. For example, all of the components shown in FIG. 1, except tank 60 and vault 270 with the components contained therein, may be pre-assembled and pre-wired with the sensing/control mechanism(s) and then placed in container 450 before being shipped to a facility. Once at the facility, propane storage tank 460 and hydrogen storage vault 470 are provided and coupled to container 450. Once utility-supplied natural gas and electricity lines have been coupled to container 450 and the output of container 450 is coupled to the telecommunications facility 480, then the unit may be activated.

As discussed, the power system described above initially employs microturbine generators to provide electrical power for a telecommunications facility. The microturbine generators are compact, efficient (both in terms of space and fuel) and reliable. By relying on microturbine generators as the main source of power, the system avoids both the reliability problems and environmental hazards inherent in internal combustion generators and the costs and environmental concerns associated with commercial electrical power. The power system also provides redundant sources of power, specifically from a commercial electrical utility and a number of proton exchange membranes, and therefore is uninterruptible. Finally, the system provides a number of super capacitors to provide electrical power during the time it takes to switch between power sources. By employing super capacitors and proton exchange membranes, the power system avoids the use of batteries thereby saving significant cost and space.

It will be appreciated by persons skilled in the art that the present invention is not limited to what has been particularly shown and described hereinabove. Rather, all matter shown in the accompanying drawings or described hereinabove is to be interpreted as illustrative and not limiting. Accordingly, the scope of the present invention is defined by the appended claims rather than the foregoing description.

What is claimed is:

1. A power supply system for providing electrical power to a telecommunications facility, said facility containing telecommunications equipment, said system comprising:
   at least one proton exchange membrane that is operable to produce DC electrical power adaptable to power said telecommunication equipment, said at least one proton exchange membrane adapted to be powered by a fuel.

2. A system as set forth in claim 1 wherein said fuel for said at least one proton exchange membrane serves as a source of hydrogen.

3. A system as set forth in claim 2 wherein said fuel is stored on site.

4. A system as set forth in claim 1, comprising:
   at least one capacitor coupled to the output of said at least one proton exchange membrane.

5. The system of claim 1, comprising:
   at least one microturbine generator operable to produce AC electrical power and adapted to be powered by a fuel.

6. The system of claim 5 comprising:
   at least one rectifier operable to convert said AC electrical power received from said at least one microturbine generator to DC electrical power adaptable to power said telecommunication equipment.

7. The system of claim 6, comprising:
   at least one capacitor coupled to the output of said at least one rectifier, said capacitor serving the purpose of avoiding power drops when switching from one energy source to another.

8. A method for supplying power to a telecommunications facility from a power supply system, said method comprising the following steps:

providing fuel to at least one proton exchange membrane, said at least one proton exchange membrane operable to produce DC electrical power; and providing said DC electrical power produced by said at least one proton exchange membrane to said telecommunications facility.

9. A method as set forth in claim 8, comprising:

executing said providing step if an amount of power from a source of AC power to the facility falls below a predetermined value.

10. The method of claim 8, comprising:

storing a portion of said DC electrical power produced by said at least one proton exchange membrane to at least one capacitor for the purpose of maintaining power during transitioning between power sources.

11. The method of claim 8, comprising:

supplying hydrogen to at least partially accomplish said fuel-providing step.

12. The method of claim 11, comprising:

presenting said hydrogen in vaporous form.

13. A back-up DC power system for a facility comprising:

a proton exchange membrane (PEM);

a source of fuel for providing hydrogen to said PEM;

a conduit for delivering said fuel to said PEM; and a facility power controller for triggering the delivery of said fuel to said PEM when a first backup source of power is required.

14. The system of claim 13, comprising:

a natural gas generator for generating a second backup source of power.

15. The system of claim 14, in which said generator is alternatively operable on propane.

16. The system of claim 13 in which said fuel for providing hydrogen is substantially pure hydrogen.

17. The system of claim 16 in which said substantially pure hydrogen is stored in a plurality of tanks.

18. The system of claim 17 in which said substantially pure hydrogen is maintained in vaporous form to ensure immediate availability.

19. The system of claim 13, wherein said facility power controller comprises:

a power sensor which senses the power available to at least a portion of said facility for the purpose of recognizing the need for a first backup source of power.

20. The system of claim 13, wherein said facility power controller comprises:

a programmable device.

* * * * *